Oct. 22, 1940.  G. SNYDER  2,218,626
LOUVER IN FENDER CONSTRUCTION
Filed June 19, 1939

Inventors
George Snyder
By
Blackmore, Spencer & Hurd
Attorney

Patented Oct. 22, 1940

2,218,626

UNITED STATES PATENT OFFICE 2,218,626

LOUVER IN FENDER CONSTRUCTION

George Snyder, Detroit, Mich., assignor to General Motors Corporation, Detroit, Mich., a corporation of Delaware Application June 19, 1939, Serial No. 279,851

4 Claims. (Cl. 280—152)

This invention relates to automotive vehicles and has particular reference to a means for passing the air through the radiator and engine compartment. The particular novelty of the invention resides in providing a passage between the engine compartment and the fender and allowing the air from the engine compartment to pass into a compartment in the fender and out through a series of louvers in the fender compartment.

In prior automobile constructions it has been customary to allow the air which passes through the radiator to leave the engine compartment either through an opening at the bottom rear of the compartment or through a plurality of louvers provided in the dividing wall between the engine compartment and the outside, the louvers of this dividing wall being placed under the fender where they are not ordinarily visible. With the present invention the partition between the engine compartment and the fender need not be provided with louvers but with a single opening. The louvers in the fender, in addition to allowing the exit of air, have a decorative effect.

Figure 1:
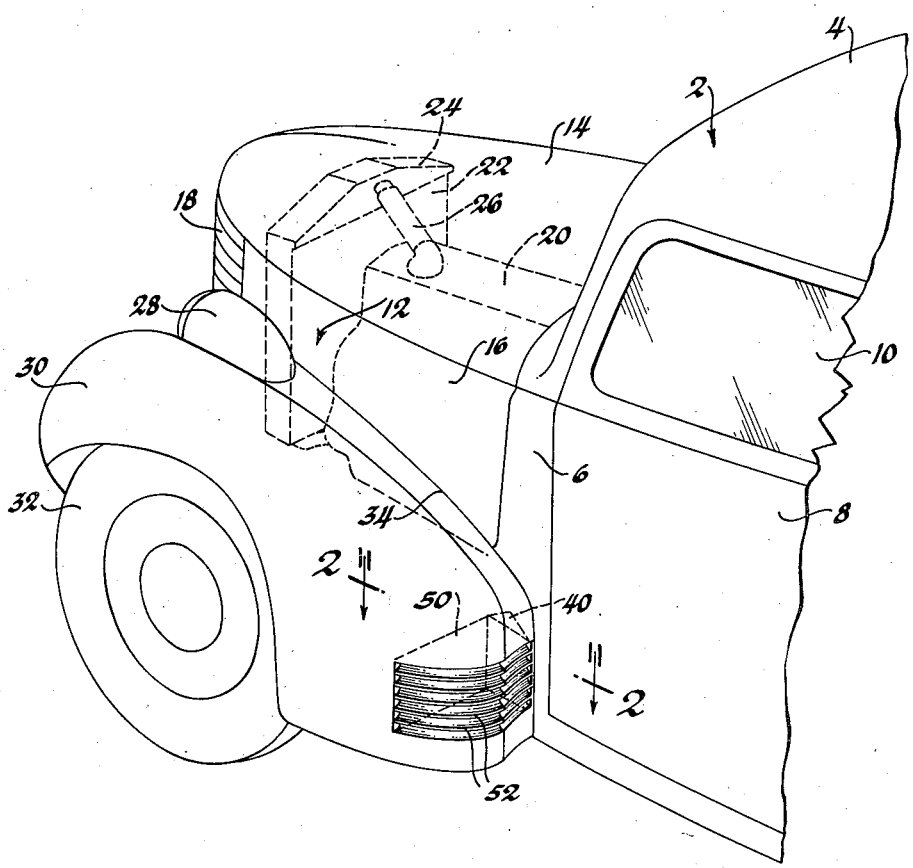
Figure 1 is a perspective view of the front end of an automotive vehicle showing the invention applied.

Referring to the drawing, the numeral 2 indicates the automotive vehicle as a whole. The vehicle has the usual metal top 4, the cowl 6, the door 8, the door window 10, and the front engine compartment 12. The compartment 12 comprises the hood door 14, the sides 16, the front grille 18, and the partition or walls 19. Inside the engine compartment there is mounted the usual internal combustion engine 20 which is provided with the usual water cooling system including a radiator 22 having the upper tank 24 and the hose connection 26 connecting the tank to the water cooling system of the engine 20. The usual headlamp is indicated at 28, the front fender at 30, and the front wheel at 32. The fender 30 joins onto the engine compartment along the line 34 which is considerably above the bottom of the vehicle and the wall or partition 19, shown in Figure 2, protects the engine compartment from the outside.

Figure 2:
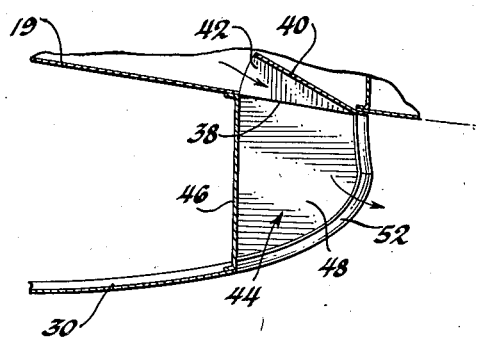
Figure 2 is a section on the line 2—2 of Figure 1.

The wall 19 has an opening 38 at the rear thereof and a scoop 40 is positioned over the opening and has its mouth 42 forwardly directed to receive the air from the engine compartment as shown by the upper arrow in Figure 2. The scoop 40 will direct air into the fender compartment 44, formed at the extreme rear end of the fender by the rear wall 46, the bottom wall 48 and the top wall 50. If desired, the rear wall may extend to the underside of the fender and the top wall 50 omitted. The rear of the compartment 44 is open to the outside and has positioned thereacross the plurality of ribs 52 which form louvers and give a decorative effect. The air will pass through the scoop 40 into the compartment 48 and to the outside as shown by the arrows in Figure 2.

It will be understood that the structure is duplicated at the other side of the vehicle.

By the use of the invention the opening at the bottom rear of the engine compartment may be closed entirely or greatly reduced and the greater part of the air passed outward through the louvers 52 in the fenders.

I claim:

1. In a means for passing air through the engine compartment of an automotive vehicle, a front fender mounted adjacent the compartment, a partition under the fender and forming the dividing wall between the compartment and the outside, said partition having an opening to enable air to be directed under the fender, and a plurality of louvers in the rear of the fender to allow the escape of air to the outside.

2. In a means for passing air through the engine compartment of an automotive vehicle, a front fender mounted adjacent the compartment, a partition under the fender and forming the dividing wall between the compartment and the outside, said partition having an opening to enable air to be delivered under the fender, a scoop across the opening to deliver the air under the fender, and a plurality of louvers in the rear of the fender to allow the escape of air to the outside.

3. In a means for passing air through the engine compartment of an automotive vehicle, a fender mounted adjacent the compartment, a partition under the fender and forming the dividing wall between the compartment and the outside, a compartment formed in the end of the fender, an opening in the partition between the two compartments, said opening enabling the passage of air from the engine compartment to the fender compartment, and a plurality of louvers in the fender to allow the escape of air.

4. In a means for passing air through the engine compartment of an automotive vehicle, a fender mounted adjacent the compartment, a partition under the fender and forming the dividing wall between the compartment and the outside, a compartment formed under the fender at the rear thereof, said partition having an opening joining the two compartments, a scoop over the opening to direct the air from the engine compartment into the fender compartment, and a plurality of louvers in the fender to allow the escape of air.

GEORGE SNYDER.